United States Patent
Saga et al.

(10) Patent No.: US 10,427,325 B2
(45) Date of Patent: Oct. 1, 2019

(54) TWIN SCREW EXTRUDER FOR USE IN MANUFACTURING FIBER-REINFORCED RESIN COMPOSITION AND PROCESS FOR MANUFACTURING FIBER-REINFORCED RESIN COMPOSITION

(71) Applicant: THE JAPAN STEEL WORKS, LTD., Shinagawa-ku, Tokyo (JP)

(72) Inventors: Daigo Saga, Hiroshima (JP); Jun Kakizaki, Hiroshima (JP); Toshifumi Ohashi, Hiroshima (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 399 days.

(21) Appl. No.: 14/913,523

(22) PCT Filed: Aug. 15, 2014

(86) PCT No.: PCT/JP2014/071470
§ 371 (c)(1),
(2) Date: Feb. 22, 2016

(87) PCT Pub. No.: WO2015/025800
PCT Pub. Date: Feb. 26, 2015

(65) Prior Publication Data
US 2016/0214277 A1    Jul. 28, 2016

(30) Foreign Application Priority Data
Aug. 23, 2013   (JP) .................................. 2013-173948

(51) Int. Cl.
*B29B 7/48*     (2006.01)
*B29C 47/60*    (2006.01)
(Continued)

(52) U.S. Cl.
CPC ................ *B29B 7/482* (2013.01); *B29B 7/90* (2013.01); *B29C 48/022* (2019.02);
(Continued)

(58) Field of Classification Search
CPC ............ B29C 47/0854; B29C 47/6031; B29C 47/1045; B29B 7/90; B29K 2105/06
See application file for complete search history.

(56) References Cited

U.S. PATENT DOCUMENTS

| 3,590,430 A | 7/1971 | Upmeier |
| 4,863,363 A * | 9/1989 | Haring .................... B29B 7/488 264/211.23 |

(Continued)

FOREIGN PATENT DOCUMENTS

| DE | 195 23 490 A1 | 1/1997 |
| DE | 10 2008 029 303 A1 | 12/2009 |

(Continued)

OTHER PUBLICATIONS

International Search Report dated Nov. 11, 2014 issued by the International Searching Authority in counterpart International Application No. PCT/JP2014/071470 (PCT/ISA/210/237).

(Continued)

*Primary Examiner* — Tony G Soohoo
*Assistant Examiner* — Elizabeth Insler
(74) *Attorney, Agent, or Firm* — Sughrue Mion, PLLC

(57) ABSTRACT

A twin screw extruder (10) according to the present invention is a twin screw extruder (10), in which a reinforcing fiber is fed through an input port (18) into a molten thermoplastic resin having been formed in a resin feed part (13) and the reinforcing fiber and the molten thermoplastic resin pass through a kneading part (15) so that a fiber-reinforced resin composition is manufactured, wherein the kneading part (15) is provided at the discharge-side end part of the (Continued)

(a)

(b)

extruder (10); a conveying part (14) is provided between the input port (18) and the kneading part (15), and tip clearance (Sc) of a screw element (12b) configuring the conveying part (14) is larger than screw clearance (Ss).

10 Claims, 2 Drawing Sheets

(51) Int. Cl.

| | | |
|---|---|---|
| *B29C 47/40* | (2006.01) | |
| *B29B 7/90* | (2006.01) | |
| *B29C 47/10* | (2006.01) | |
| *B29C 48/54* | (2019.01) | |
| *B29C 48/57* | (2019.01) | |
| *B29C 48/40* | (2019.01) | |
| *B29C 48/285* | (2019.01) | |
| *B29C 48/92* | (2019.01) | |
| *B29C 48/00* | (2019.01) | |
| *B29C 48/625* | (2019.01) | |
| *B29B 7/84* | (2006.01) | |
| *B29B 9/06* | (2006.01) | |
| *B29B 9/14* | (2006.01) | |
| *B29K 77/00* | (2006.01) | |
| *B29K 307/04* | (2006.01) | |
| *B29K 309/08* | (2006.01) | |
| *B29K 105/12* | (2006.01) | |
| *B29C 48/04* | (2019.01) | |
| *B29C 48/76* | (2019.01) | |

(52) U.S. Cl.
CPC ........ *B29C 48/2886* (2019.02); *B29C 48/297* (2019.02); *B29C 48/402* (2019.02); *B29C 48/54* (2019.02); *B29C 48/57* (2019.02); *B29C 48/625* (2019.02); *B29C 48/92* (2019.02); *B29B 7/845* (2013.01); *B29B 9/06* (2013.01); *B29B 9/14* (2013.01); *B29C 48/04* (2019.02); *B29C 48/767* (2019.02); *B29C 2948/92142* (2019.02); *B29C 2948/92266* (2019.02); *B29C 2948/92447* (2019.02); *B29C 2948/92638* (2019.02); *B29C 2948/92761* (2019.02); *B29C 2948/92942* (2019.02); *B29K 2077/00* (2013.01); *B29K 2105/12* (2013.01); *B29K 2307/04* (2013.01); *B29K 2309/08* (2013.01); *B29K 2995/0077* (2013.01); *B29K 2995/0082* (2013.01)

(56) References Cited

U.S. PATENT DOCUMENTS

| | | | | |
|---|---|---|---|---|
| 4,867,927 | A | * | 9/1989 | Funaki ................ B29C 47/0021 264/180 |
| 5,110,275 | A | * | 5/1992 | Scheuring ........... B29C 47/0004 366/76.1 |
| 5,824,410 | A | | 10/1998 | Sakai et al. |
| 5,879,602 | A | | 3/1999 | Scheuring |
| 7,419,295 | B2 | * | 9/2008 | Inoue .................. B29C 47/0011 366/75 |
| 2009/0097350 | A1 | | 4/2009 | Fukutani et al. |
| 2011/0112255 | A1 | | 5/2011 | Bierdel |
| 2011/0158039 | A1 | | 6/2011 | Bierdel et al. |

FOREIGN PATENT DOCUMENTS

| | | |
|---|---|---|
| EP | 2 072 217 A1 | 6/2009 |
| JP | 8-300442 A | 11/1996 |
| JP | 2001-192466 A | 7/2001 |
| JP | 2006-291104 A | 10/2006 |
| JP | 2009242616 A | 10/2009 |
| JP | 2011-524284 A | 9/2011 |
| JP | 2012-172086 A | 9/2012 |
| JP | 2012-214819 A | 11/2012 |
| JP | 2013-23672 A | 2/2013 |
| WO | 2013089097 A1 | 6/2013 |
| WO | 2014185199 A1 | 11/2014 |

OTHER PUBLICATIONS

Communication dated Aug. 16, 2016; issued by the European Patent Office in counterpart European Patent Application No. 14838308.6.
Communication dated Jul. 13, 2017, from the European Patent Office in counterpart European Application No. 14838308.6.

* cited by examiner (a)

(b)

TWIN SCREW EXTRUDER FOR USE IN MANUFACTURING FIBER-REINFORCED RESIN COMPOSITION AND PROCESS FOR MANUFACTURING FIBER-REINFORCED RESIN COMPOSITION

TECHNICAL FIELD

The present invention relates to a twin screw extruder, which prevents thread breakage of a reinforcing fiber fed as a roving and is used in manufacturing a fiber-reinforced resin composition containing a reinforcing fiber having a controlled fiber length, and a method for manufacturing a fiber-reinforced resin composition using the twin screw extruder.

BACKGROUND ART

A fiber-reinforced resin is excellent in specific strength, moldability, and the like and the application field thereof has been extended. In automobile components for which mass production is expected, the application range of the fiber-reinforced resin has been gradually extended starting from application to special motor vehicles and specific components and, owing to recent environmental problems and the like, there is a pressing need for weight saving of automobiles, and acceleration of the application of the fiber-reinforced resin to general automobile components has been expected.

In the application of the fiber-reinforced resin to general automobile components, a fiber-reinforced resin using a thermoplastic resin as a matrix reinforced with glass fiber or carbon fiber has been developed and it is required to lengthen the fiber length of the reinforcing fiber contained in a molded article and to increase the content of the reinforcing fiber. For example, PTL 1 proposes a fiber-reinforced flame-retardant thermoplastic resin composition, a molded article, and a method for manufacturing a fiber-reinforced flame-retardant thermoplastic resin composition. The weight-average fiber length of the reinforcing fiber in the resin composition is preferably 3 mm or more and more preferably from 5 to 50 mm. The weight-average fiber length of the reinforcing fiber in the molded article is preferably 1 mm or more, more preferably from 1 to 10 mm, and further preferably from 1.2 to 8 mm. Moreover, it is described that the ratio of the reinforcing fiber having a fiber length of 1 mm or more in the molded article is preferably 30% by weight or more and more preferably from 33 to 95% by weight in the whole reinforcing fiber.

PTL 2 proposes a long fiber-reinforced polyamide resin composition containing (A) 20 to 80% by mass of a polyamide having excellent strength, thermal strength, durability, low-water absorbability, and heat-resistant stability and (B) 20 to 80% by mass of a reinforcing fiber having a weight-average fiber length of 1 to 15 mm. As Examples, in the case of inventive examples in which a glass fiber roving is introduced into an impregnation die, impregnated with a polyamide resin fed from a twin screw extruder, subsequently pulled out, and cut by a pelletizer to produce pellets having a length of 10 mm and injection molding is performed using them, it is shown that a weight-average fiber length of 10 mm in the pellet state becomes a weight-average fiber length of 3.4 to 4.75 mm in a molded article. On the other hand, in the case of comparative examples in which a polyamide resin and glass fiber chopped strands are fed to a twin screw extruder and melt-kneaded, the resulting one is cooled and solidified in a water-cooled bath into a strand form, subsequently pellets having a length of 3 mm are produced, and injection molding is performed using them, it is shown that a weight-average fiber length of 0.27 mm in the pellet state becomes a weight-average fiber length of 0.23 mm in a molded article.

PTL 3 proposes a carbon fiber-reinforced resin composition obtained by blending 10 to 300 parts by weight of carbon fiber (B) and 1 to 100 parts by weight of a non-crystalline resin (C) into 100 parts by weight of a thermoplastic polyamide resin (A) having excellent mechanical properties, surface appearance and the like, particularly excellent tensile strength, flexural modulus, appearance/designing ability, and dimensional stability. In a molded article obtained by feeding the polyamide resin and carbon fiber cut into 6.0 mm (cut fiber) to a twin screw extruder and melt-kneading them, cooling and solidifying the resulting one in a water-cooled bath into a strand form, subsequently producing pellets having a length of 3.0 mm, and performing injection molding using them, it is shown that the weight-average fiber length of the carbon fiber is from 0.24 to 0.27 mm.

PTL 4 proposes a resin injection molded article obtained by injection molding of a thermoplastic resin into which a reinforcing fiber and a particulate solid matter are mixed, wherein the particulate solid matter is defined such that an aspect ratio is from 1 to 5, an average particle diameter is 10 $\mu$m or less, and a blending amount is from 0.5 to 5% by weight. There are shown Examples in which molded articles of a glass fiber or carbon fiber-reinforced resin using polypropylene or a polyamide resin as a matrix are produced by three methods.

In the three methods, the first method is a method in which a roving of glass fiber or carbon fiber is impregnated with polypropylene or a polyamide resin by introducing it into an impregnation die, then pulled out, and cut by a pelletizer to produce columnar pellets and injection molding is performed using them. The second method is a method in which polypropylene and glass fiber or carbon fiber are melt-kneaded by means of a twin screw extruder, cooled and solidified in a water-cooled bath into a strand form, and subsequently cut to produce chopped pellets and they are subjected to injection molding. The third method is a method in which polypropylene and roving-like glass fiber are fed to a twin screw extruder and melt-kneaded and the resulting one is fed to an injection molding machine to perform molding. According to test results, it is shown that the reinforcing fiber is less prone to break due to a lubricating effect resulting from the addition of the particulate solid matter and the weight average fiber length of the molded article is from 0.67 to 2.85 mm in the case where the particulate solid matter is added.

CITATION LIST

Patent Literature

PTL 1: JP-A-2012-214819
PTL 2: JP-A-2012-172086
PTL 3: JP-A-2013-23672
PTL 4: JP-A-2009-242616

SUMMARY OF INVENTION

Technical Problem

In manufacturing a fiber-reinforced resin molded article, since a reinforcing fiber is broken and shortened during melt-kneading in an extruder or during injection molding, in the method of using a cut fiber as described in PTL 3, it is not easy to manufacture a molded article containing a reinforcing fiber having a weight average length of 1 mm or more. Therefore, in order to manufacture a fiber-reinforced resin molded article in which the fiber length is long, preferred is a method of injection molding using pellets obtained by cutting a roving of a reinforcing fiber impregnated with a thermoplastic resin into appropriate length, as described in PTLs 1, 2 or 4. Moreover, this method has an advantage that the fiber length of the reinforcing fiber can be adjusted to appropriate length since the length of the reinforcing fiber is equal to the length of the pellets.

On the other hand, the method of injection molding of the composition just obtained by feeding a thermoplastic resin and a roving of glass fiber to a twin screw extruder and melt-kneading them, which is the third method described in PTL 4, has advantages that a fiber-reinforced resin molded article in which the weight average fiber length is 1 mm or more can be manufactured and a fiber-reinforced resin molded article can be efficiently manufactured since a step and an effort for producing pellets of the fiber-reinforced resin composition as in the method described in PTLs 1, 2 or 4 (first method) are not required.

However, the third method described in PTL 4 uses a roving of glass fiber but the weight average fiber length is shorter than that in case of the first method. Moreover, PTL 4 describes no Example in which a roving of carbon fiber is used. In order to apply a fiber-reinforced resin to general automobile components, efficient manufacture and economical efficiency of a fiber-reinforced resin molded article are needed and further, a manufacturing method capable of lengthening the fiber length of the reinforcing fiber in the molded article and capable of increasing the content is required. Furthermore, there is requested a method for manufacturing a fiber-reinforced resin composition capable of adjusting the fiber length of the reinforcing fiber to appropriate length without a production step of pellets and a particular additive.

In view of such conventional problems and requests, an object of the present invention is to provide a method for manufacturing a fiber-reinforced resin composition capable of lengthening the fiber length of a reinforcing fiber of a molded article and capable of increasing the content through feeding a thermoplastic resin and a roving of the reinforcing fiber to a twin screw extruder.

Solution to Problem

A twin screw extruder according to the present invention is a twin screw extruder, in which a reinforcing fiber is fed through an input port into a molten thermoplastic resin having been formed in a resin feed part and the reinforcing fiber and the molten thermoplastic resin pass through a kneading part so that a fiber-reinforced resin composition is manufactured, wherein: the kneading part is provided at a discharge-side end part of the twin screw extruder; a conveying part is provided between the input port and the kneading part; and tip clearance of a screw element configuring the conveying part is larger than screw clearance. Here, the tip clearance means a minimum gap between the inner peripheral surface of the cylinder of the twin screw extruder and the outer edge of the screw (screw element). The screw clearance means a minimum gap between opposing screws (screw elements) of the twin screw extruder.

In the above invention, L/D of the conveying part may be 3 or more and L/D of the kneading part may be from 0.5 to 4.0. Here, L/D means a so-called L/D ratio and means a ratio of the diameter D of the outer edge of the screw element to the length L of the twin screw extruder.

Further a later conveying part having an L/D of 1 or more may be provided at a downstream of the kneading part.

Further, in the above invention, a fiber relaxing part configured by an screw element, minimum outer peripheral length of which has a value smaller than that of the screw element configuring the conveying part, may be provided between the conveying part and the kneading part. The screw element configuring the fiber relaxing part may be a torpedo screw Further, a pin may be protruded from a cylinder of the twin screw extruder toward the screw element at an upstream of the kneading part, said screw element having a clearance which does not interfere with the pin. Degree of protrusion of the pin from the cylinder may be 0.1 D or more.

Further, a twin screw extruder of the present invention is a twin screw extruder, in which a roving-like reinforcing fiber is fed through an input port into a molten thermoplastic resin having been formed in a resin feed part and the reinforcing fiber and the molten thermoplastic resin pass through a kneading part so that a fiber-reinforced resin composition is manufactured, wherein: the kneading part is provided at a discharge-side end part of the twin screw extruder; a conveying part is provided between the input port and the kneading part; and tip clearance of each of screw elements configuring the conveying part is larger than screw clearance such that roving-like reinforcing fiber is conveyed while being stretched over outer peripheries of the screw elements that mesh with each other in the conveying part.

A method for manufacturing a fiber-reinforced resin composition according to the present invention is a method for manufacturing a fiber-reinforced resin composition using a twin screw extruder, in which a roving-like reinforcing fiber is fed into a molten thermoplastic resin having been formed in a resin feed part and the reinforcing fiber and the molten thermoplastic resin sequentially pass through a conveying part and a kneading part so that a fiber-reinforced resin composition is manufactured, wherein: the roving-like reinforcing fiber is conveyed in a tense state in the conveying part; and the roving-like reinforcing fiber is cut and kneaded in a relaxed state in the kneading part. The roving means a fiber bundle of filaments of glass, carbon fiber, or the like and a continuous thread- or string-like fiber bundle. The word of roving-like means a form of such a fiber bundle.

In the above method for manufacturing a fiber-reinforced resin composition, disturbance may be generated in a part of a flow line of the roving-like reinforcing fiber introduced from the conveying part into the kneading part.

Advantageous Effects of Invention

According to the twin screw extruder of the present invention, a fiber-reinforced resin composition capable of lengthening the fiber length of the reinforcing fiber of a molded article and capable of increasing the content can be molded. Furthermore, using the fiber-reinforced resin composition, a fiber-reinforced resin molded article in which the fiber length of the reinforcing fiber is adjusted and the content is adjusted can be efficiently manufactured. When the fiber-reinforced resin composition molded by the twin screw extruder of the invention is fed in a state maintained at a high temperature to an injection molding machine, the fiber-reinforced resin molded article can be efficiently manufactured.

BRIEF DESCRIPTION OF DRAWINGS

FIG. 1(a) is a screw axis direction (longitudinal) cross-sectional view and FIG. 1(b) is a transverse cross-sectional view of the resin feed part (or kneading part).

DESCRIPTION OF EMBODIMENTS

Figure 1:
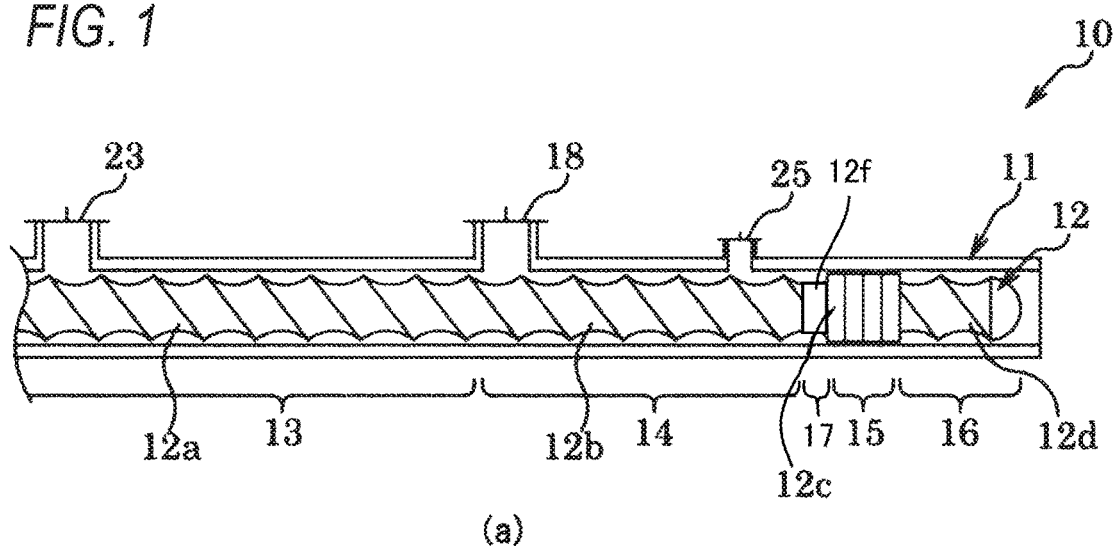
FIG. 1(a) and FIG. 1(b) are schematic views of the twin screw extruder of the invention.
Figure 1:
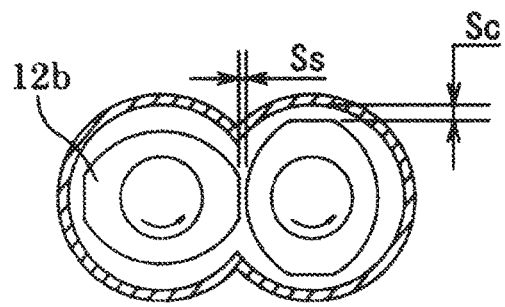

The following will describe modes for carrying out the invention based on Drawings. FIG. 1(a) and FIG. 1(b) are schematic views illustrating an Example of the twin screw extruder of the invention. As shown in FIG. 1(a), the twin screw extruder 10 has screws 12 inside a cylinder 11 and comprises a resin feed part 13, a conveying part 14, a kneading part 15, and a later conveying part 16 from an upstream side toward a downstream side. The resin feed part 13, the conveying part 14, the kneading part 15, and the later conveying part 16 have screw elements 12a, 12b, 12c, and 12d of the screws 12, respectively. A molten thermoplastic resin is formed in the resin feed part 13 and an input port 18 for feeding a reinforcing fiber to the molten thermoplastic resin is provided.

In the twin screw extruder 10, the resin feed part 13 is a part in which the necessary molten thermoplastic resin is formed. The resin feed part 13 may have a mode of feeding a thermoplastic resin from an input port 23 to form the molten thermoplastic resin or may have a mode of configuring the resin feed part 13 together with a first-stage extruder connected at an upstream side like a tandem extruder. The conveying part 14 is provided between the resin feed part 13 and the kneading part 15. The conveying part 14 is a part for conveying the reinforcing fiber fed from the input port 18 and the molten thermoplastic resin formed in the resin feed part 13 toward the kneading part 15 and mixing them.

In the conveying part 14 of the twin screw extruder 10, as shown in FIG. 1(b), tip clearance Sc of the screw element 12b configuring the conveying part 14 is larger than screw clearance Ss. As for actual size of the tip clearance Sc or the screw clearance Ss, the most suitable size is selected depending on the material and size of the reinforcing fiber to be used, the specifications of the twin screw extruder, and the like. In the conveying part 14, the size of the tip clearance Sc and the size of the screw clearance Ss are determined so as to be a state that a roving-like reinforcing fiber is conveyed in a tense state without generating thread breakage and the reinforcing fiber 31 is conveyed while being stretched over the outer peripheries of the screw elements that mesh with each other in the conveying part as shown in FIG. 2. As a screw element configuring such a conveying part 14, for example, a full-flight screw having a thick root diameter and a decreased outside diameter can be used.

The kneading part 15 of the twin screw extruder 10 is a part for kneading and dividing the roving of the reinforcing fiber conveyed together with the molten thermoplastic resin and homogeneously dispersing the roving. In order to exhibit the function of the kneading part 15, first, it is suitable to relax the roving of the reinforcing fiber conveyed in a tense state. For this purpose, it is suitable to provide a fiber relaxing part 17 that is configured by a screw element 12f in which the minimum outer peripheral length of the screw element has a value smaller than that of the screw element of the conveying part. As the screw element 12f configuring the fiber relaxing part 17, for example, a torpedo screw can be used. Incidentally, the torpedo screw is a screw element in which the outside diameter is a short diameter without any flight.

As the screw element of the kneading part 15, a kneading disk, a gear kneading disk, or a reverse lead flight screw element having high distribution performance, and the like can be used. The fiber length of the reinforcing fiber of the fiber-reinforced resin composition can be lengthened and also the content can be increased by the configuration of the screw element of the conveying part 14 and the configuration of the screw element of the kneading part 15. The fiber length of the reinforcing fiber can be adjusted to a length in the range of preferably 1 mm or more, more preferably from 1 to 100 mm. Moreover, the reinforcing fiber can be contained up to about 30% as a volume ratio (40% as a weight ratio).

Figure 3:
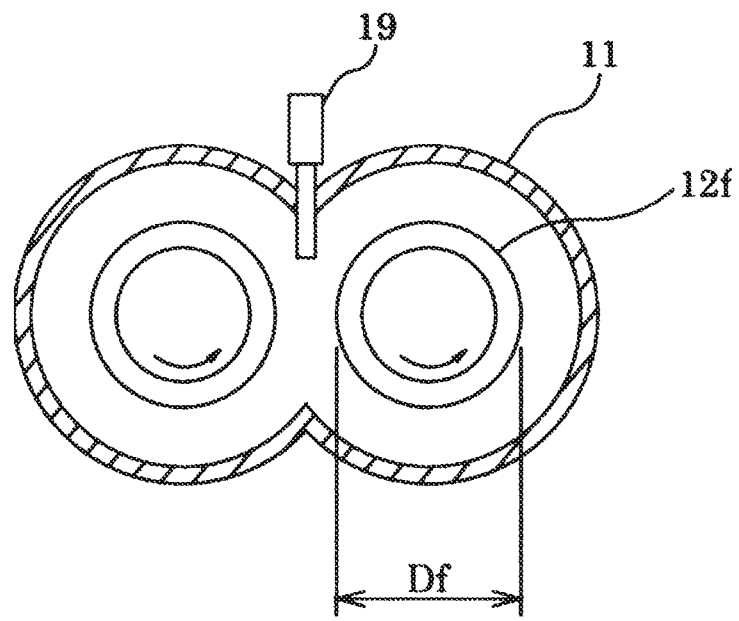
FIG. 3 is a schematic view showing a pin that protrudes from the cylinder of the twin screw extruder to a screw element direction.

Furthermore, in the twin screw extruder 10, although the position is not necessarily limited, it is suitable to protrude a pin 19 from the cylinder 11 of the twin screw extruder 10 toward a screw element 12f as shown in FIG. 3, at a rear edge part of the fiber relaxing part 17 or conveying part 14 and at an upstream of the kneading part 15. By the pin 19, disturbance can be generated at a part of the flow line of the roving-like reinforcing fiber introduced from the conveying part 14 to the kneading part 15, and a long fiber discharged resulting from insufficient dividing or cutting can be prevented from mixing into the fiber-reinforced resin composition. The pin 19 is suitably protruded from the inner peripheral surface of the cylinder 11 by 0.1× cylinder inside diameter (Di) or more. In the case of protruding such a pin 19, a screw element has such a clearance that does not interfere with the pin 19. Incidentally, Di is almost equal to the diameter D of outer edge of the screw element in the resin feed part or the kneading part.

L/D of the conveying part 14 is suitably 3 or more. L/D of the kneading part 15 may be from 0.5 to 4.0 and a suitable value is selected according to the objective fiber length of the reinforcing fiber. When L/D of the kneading part 15 is large, the number of times for cutting the reinforcing fiber increases, so that the fiber length becomes short. Upon suitable cutting and dispersion of the reinforcing fiber, it is appropriate that the reinforcing fiber is promptly discharged from the twin screw extruder 10 to prevent unnecessary cutting. For this purpose, it is suitable to provide the kneading part 15 at a discharge end part of the twin screw extruder 10. However, in order to perform stable discharge of the kneaded reinforcing fiber composition, the later conveying part 16 may be provided. L/D of the later conveying part 16 may be 1 or more.

EXAMPLES

Figure 2:
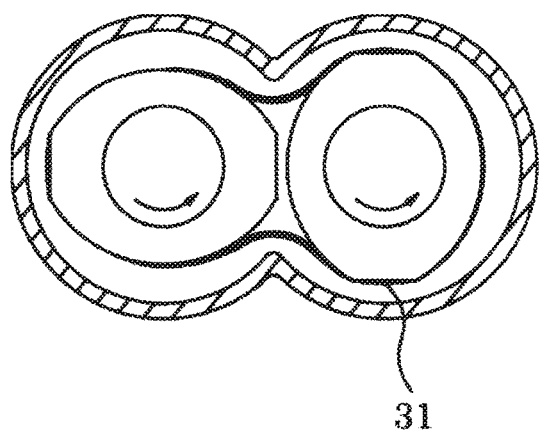
FIG. 2 is a transverse cross-sectional view of the conveying part of the twin screw extruder shown in FIG. 1.

A test for manufacturing a fiber-reinforced resin composition by means of a twin screw extruder having a configuration shown in FIG. 1 (a twin screw extruder Tex 44 manufactured by Japan Steel Works Ltd.) was performed. A polyamide 6 resin (PA6) was used as a thermoplastic resin and a roving-like carbon fiber in which single fibers having a fiber diameter of 7 μm were bundled was used as a reinforcing fiber.

In the twin screw extruder, the conveying part was configured by a standard full-flight screw (standard FF), a full-flight screw (FF1) in which tip clearance Sc is larger than screw clearance Ss and screw clearance Ss is larger than standard FF, or a full-flight screw (FF2) in which tip clearance Sc is larger than screw clearance Ss and screw clearance Ss is equal to standard FF. L/D of the conveying part was 12.

The kneading part was configured by a standard kneading disk (KD) or a combination of a torpedo screw (TR) and a reverse lead flight screw (BMS) having one-line notch. L/D of the kneading part was 1. The kneading part was provided at a discharge-side end part of the twin screw extruder and, following the kneading part, the later conveying part (L/D=1) was provided at a discharge-side endmost part. Moreover, before ((before) in the column of Vent of Table 1, vent 25) or after the kneading part, a vent is provided.

The manufacturing test was performed in the case where the pin 19 to be protruded from the cylinder of the twin screw extruder is present or absent. The degree of protrusion of the pin was 0.20 Di, the outside diameter was 0.23 Di, and the pin was arranged at the positional part on which the torpedo screw was provided.

Table 1 shows test results. In Table 1, the thread breakage means that the thread is broken at the place (conveying part) where the roving was inserted into the twin screw extruder, and the molten resin gathers to the part at which the thread is broken, so that portions locally excessively impregnated with the molten resin and portions insufficiently impregnated therewith are generated and thus the quality of the fiber-reinforced resin composition is deteriorated. The fiber length means an average fiber length (mm) and, as for the average fiber length, "long" indicates about 30 mm, "medium" indicates about 25 mm, and "short" indicates from 10 to 1 mm. Surging means an unstable phenomenon that the degree of filling the inside of the twin screw extruder and the state of kneading are periodically largely fluctuated. Short pass means that the roving is discharged as an uncut/undispersed one (having a length of 50 mm or more) owing to insufficient kneading, and such one deteriorates the quality when mixed into products.

When the results of Inventive Example 5 and Comparative Example in Table 1 are compared, the effect of each screw element of the conveying part is clearly shown: thread breakage is not generated in the case of Inventive Example but thread breakage is generated in the case of Comparative Example (conventional method). Therefore, in the case of Comparative Example, it is difficult to manufacture the fiber-reinforced resin composition smoothly. In the case of Inventive Example 5, since the screw element of the kneading part is configured by a standard kneading disk, the fiber length of the reinforcing fiber becomes short.

Moreover, as shown in Table 1, according to Inventive Example 1, it is revealed that a fiber-reinforced resin composition having such a long fiber length that the average fiber length of the reinforcing fiber is about 30 mm can be manufactured. Furthermore, as shown in Inventive Examples 1 to 5, it is revealed that, according to the invention, it is possible to manufacture a fiber-reinforced resin composition in which an average fiber length of the reinforcing fiber is 1 mm or more and the fiber length of the reinforcing fiber is adjusted.

TABLE 1

| | | Configuration of twin screw extruder | | | | Test results | | | |
|---|---|---|---|---|---|---|---|---|---|
| | Number | Conveying part | Kneading part | Pin | Vent | Thread breakage | Fiber length | Surging | Short pass |
| Inventive Example | 1 | FF2 | TR + BMS | present | before | no | long | no | no |
| | 2 | FF1 | TR + BMS | present | before | no | long | small | no |
| | 3 | FF1 | TR + BMS | present | after | no | medium | small | no |
| | 4 | FF1 | TR + BMS | absent | after | no | medium | small | yes |
| | 5 | FF1 | KD | absent | after | no | short | small | no |
| Comparative Example | 1 | Standard FF | KD | absent | after | yes | short | large | no |

When Inventive Example 3 and Inventive Example 4 are compared, it is shown that the generation of the short pass depends on the presence or absence of the pin and thus, it is revealed that the effect of the pin is clearly shown. Moreover, when Inventive Example 2 and Inventive Example 3 are compared, it is revealed that the positional relation of the vent and the kneading part influences the average fiber length of the reinforcing fiber. Incidentally, in Inventive Examples 2 to 5, surging was observed although the degree was small. For the prevention of the generation of surging, it is understood that further adjustment of the configuration, L/D, and the like of the screw elements is necessary.

While the invention has been described in detail and with reference to specific embodiments thereof, it will be apparent to one skilled in the art that various changes and modifications can be made therein without departing from the spirit and scope thereof. The present application is based on Japanese Patent Application No. 2013-173948 filed on Aug. 23, 2013, and the contents are incorporated herein by reference.

REFERENCE SIGNS LIST

10 Twin screw extruder
11 Cylinder
12 Screw
13 Resin feed part
14 Conveying part
15 Kneading part
16 Later conveying part
18 Input port
19 Pin
23 Input port
25 Vent
31 Reinforcing fiber

The invention claimed is:

1. A twin screw extruder comprising:
a cylinder housing twin screws arranged in parallel;
a resin feed part configured to feed a molten thermoplastic resin;
an input port arranged on the cylinder, and configured to receive a reinforcing fiber, the reinforcing fiber being fed through the input port into the molten thermoplastic resin located in the resin feed part of the cylinder;
a discharge-side part arranged at one end of the twin screw extruder;
a kneading part provided closer to the discharge-side part than a midpoint of the twin screw extruder, and configured to knead the reinforcing fiber and the molten thermoplastic resin to manufacture a fiber-reinforced resin composition;
a conveying part provided between the input port and the kneading part and configured to convey the reinforcing fiber and the molten thermoplastic resin to the kneading part;
a fiber relaxing part configured by a screw element, a minimum outer peripheral length of which has a value smaller than that of the screw element configuring the conveying part, the fiber relaxing part being provided between the conveying part and the kneading part, and adjacent to the conveying part and the kneading part and
a pin that protrudes into an interior of the cylinder of the twin screw extruder,
wherein a tip clearance is a distance between one of the twin screws and the cylinder, and a screw clearance is a distance between outer edges of the twin screws in a cross-sectional view perpendicular to rotational axes of the twin screws, and the tip clearance is larger than the screw clearance.

2. The twin screw extruder according to claim 1, wherein L is a length of a portion of the twin screw extruder, and D is a diameter of an outer edge of a screw of the twin screws, and
wherein a ratio L/D of the conveying part is 3 or more and a ratio L/D of the kneading part is from 0.5 to 4.0.

3. The twin screw extruder according to claim 1, wherein L is a length of a portion of the twin screw extruder, and D is a diameter of an outer edge of a screw of the twin screws, and
wherein a later conveying part having a ratio L/D of 1 or more is provided at a portion of the twin screw extruder downstream of the kneading part.

4. The twin screw extruder according to claim 1, wherein the screw element configuring the fiber relaxing part is a torpedo screw.

5. The twin screw extruder according to claim 1, wherein the pin protrudes toward the twin screws at a portion of the twin screw extruder upstream of the kneading part, said twin screws having tip clearances which do not interfere with the pin.

6. The twin screw extruder according to claim 5, wherein D is a diameter of an outer edge of a screw element, and a degree of protrusion of the pin into the cylinder is 0.1 D or more.

7. A twin screw extruder comprising:
a cylinder housing twin screws arranged in parallel;
a resin feed part configured to feed a molten thermoplastic resin;
an input port arranged on the cylinder and configured to receive a reinforcing fiber, the reinforcing fiber being fed through the input port into the molten thermoplastic resin located in the resin feed part of the cylinder;
a discharge-side part arranged at one end of the twin screw extruder;
a kneading part provided closer to the discharge-side part than a midpoint of the twin screw extruder, and configured to knead the reinforcing fiber and the molten thermoplastic resin to manufacture a fiber-reinforced resin composition;
a conveying part provided between the input port and the kneading part, and configured to convey the reinforcing fiber and the molten thermoplastic resin to the kneading part; and
a fiber relaxing part configured by a screw element, a minimum outer peripheral length of which has a value smaller than that of the screw element configuring the conveying part, the fiber relaxing part being provided between the conveying part and the kneading part, and adjacent to the conveying part and the kneading part and
a pin that protrudes into an interior of the cylinder of the twin screw extruder,
wherein a tip clearance is a distance between one of the twin screws and the cylinder, and a screw clearance is a distance between outer edges of the twin screws in a cross-sectional view perpendicular to rotational axes of the twin screws,
wherein tip clearances of each of the twin screws arranged in the conveying part are larger than the screw clearance, and
wherein the reinforcing fiber is conveyed while being stretched over outer peripheries of the twin screws that mesh with each other in the conveying part.

8. The twin screw extruder according to claim 1, wherein the pin protrudes toward the twin screws at a portion of the twin screw extruder upstream of the kneading part, said twin screws having tip clearances which do not interfere with the pin.

9. The twin screw extruder according to claim 8, wherein D is a diameter of an outer edge of a screw element, and a degree of protrusion of the pin into the cylinder is 0.1 D or more.

10. The twin screw extruder according to claim 1, further comprising:
screw elements provided in the twin screws,
wherein the conveying part is configured to convey the reinforcing fiber and the molten thermoplastic resin to the kneading part in a state where the reinforcing fiber is conveyed while being stretched over outer peripheries of the screw elements that mesh with each other in the conveying part.

* * * * *